United States Patent
Yuan et al.

(10) Patent No.: US 11,868,758 B2
(45) Date of Patent: Jan. 9, 2024

(54) METHOD FOR IMPROVING THE UPDATING OF FIRMWARE AND SYSTEM APPLYING THE METHOD

(71) Applicant: Fulian Precision Electronics (Tianjin) Co., LTD., Tianjin (CN)

(72) Inventors: Jie Yuan, Tianjin (CN); Shi-Qi Chen, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 43 days.

(21) Appl. No.: 17/524,922

(22) Filed: Nov. 12, 2021

(65) Prior Publication Data

US 2023/0116294 A1   Apr. 13, 2023

(30) Foreign Application Priority Data

Sep. 26, 2021  (CN) .......................... 202111130097.4

(51) Int. Cl.
*G06F 9/445* (2018.01)
*G06F 8/65* (2018.01)

(52) U.S. Cl.
CPC ...................................... *G06F 8/65* (2013.01)

(58) Field of Classification Search
CPC ..... G06F 8/65; G06F 8/71; G06F 8/61; G06F 8/60; G06F 9/44505; G06F 9/4451; G06F 16/23; G06F 16/1873; G06F 40/186; G06F 12/0806; G06F 40/197; H04L 67/306; H04L 67/303; H04L 67/55; H04L 41/12; H04L 41/5054; H04L 43/0817; H04L 67/30; H04L 41/20

USPC .................................................. 717/168–178
See application file for complete search history.

(56) References Cited

U.S. PATENT DOCUMENTS

| | | | | |
|---|---|---|---|---|
| 5,822,692 A * | 10/1998 | Krishan | .............. | H04W 52/028 340/7.54 |
| 10,437,581 B1 * | 10/2019 | Patil | .......................... | G06F 8/71 |
| 10,585,816 B1 * | 3/2020 | Lambert | ............... | G06F 13/122 |
| 2014/0101653 A1 * | 4/2014 | Dharmadhikari | ......... | G06F 8/65 717/173 |
| 2020/0257518 A1 * | 8/2020 | Liedtke | ..................... | G06F 8/65 |

FOREIGN PATENT DOCUMENTS

| | | |
|---|---|---|
| CN | 112003723 A | 11/2020 |
| TW | I569605 B | 2/2017 |
| TW | I720468 B | 3/2021 |

* cited by examiner

*Primary Examiner* — Chuck O Kendall
(74) *Attorney, Agent, or Firm* — ScienBiziP, P.C.

(57) ABSTRACT

A method to improve the updating of firmware in a firmware updating system, uses serially-sent data packets containing the update and data. The firmware updating system includes storage, including an expander/switch, a baseboard manager controller (BMC), and a storage interface. A universal asynchronous receiver/transmitter (UART) for serial communication in the expander/switch is initialized and firmware updating instruction is sent to the expander/switch by the BMC. The firmware data packets are sent to the expander/switch by the BMC. A serial instruction to reset is sent to the expander/switch by the BMC and the BMC ends a communication with the UART serial. A firmware updating system applying the method is also provided.

14 Claims, 3 Drawing Sheets

METHOD FOR IMPROVING THE UPDATING OF FIRMWARE AND SYSTEM APPLYING THE METHOD

FIELD

The subject matter herein generally relates to data transmission, particularly to firmware update, a method for improving firmware update, and a system applying the method.

BACKGROUND

In cloud computing, cloud storing, and big data field, storage performance and convenient management of servers are important. Different types of hard disks and flash memories are centrally managed. Serial attached small computer system interface (SAS) expander or peripheral component interconnect express (PCIE) switch is used for expanding. Using the SAS expander or the PCIE switch to manage the hard disks or the flash memories, firmware in the SAS expander or the PCIE switch needs to be updated without interference to data transmission in the SAS expander or the PCIE switch.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely some embodiments, not all the embodiments.

In addition, terms such as "first" and "second" are used herein for purposes of description and are not intended to indicate or imply relative importance or significance or to imply the number of indicated technical features. Thus, a feature defined with "first" and "second" may comprise one or more of these features. In the description of the present disclosure, "a plurality of" means at least two, such as two, three and so on, unless specified otherwise. In the embodiments of the present disclosure, the term such as "example" or "for example" is used to represent "giving an example, an illustration, or a description". Any embodiment or design scheme described as "an example" in this application should not be considered as being more preferred or having more advantages than another embodiment or design scheme. However, the word "example" or the expression "for example" is intended to present a concept in a specific manner.

Other embodiments achieved according to the specific embodiments described herein by those of an ordinary skill in the art are within the protecting range of the present disclosure.

In cloud computing, cloud storing, and big data field, different types of hard disks and flash memories are centrally managed. Serial attached small computer system interface (SAS) expander or peripheral component interconnect express (PCIE) switch are used for expanding. Using the SAS expander or the PCIE switch to manage the hard disks or the flash memories, firmware in the SAS expander or the PCIE switch needs to be updated without interference being caused to data transmission in the SAS expander or the PCIE switch.

In a related art, the firmware of the SAS expander or the PCIE switch can only be updated locally. External devices need to be connected or data transmission in the SAS expander or the PCIE switch needs to be cut off.

The present disclosure provides a firmware updating method and a firmware updating system, using an expander or a universal asynchronous receiver/transmitter (UART). No hardware needs to be adjusted, and the updating process is executed directly in the expander or the switch.

Hereinafter, some embodiments of the present disclosure are described with reference to the accompanying drawings and the embodiments. The embodiments and features in the embodiments can be combined with each other without conflict.

Figure 1:
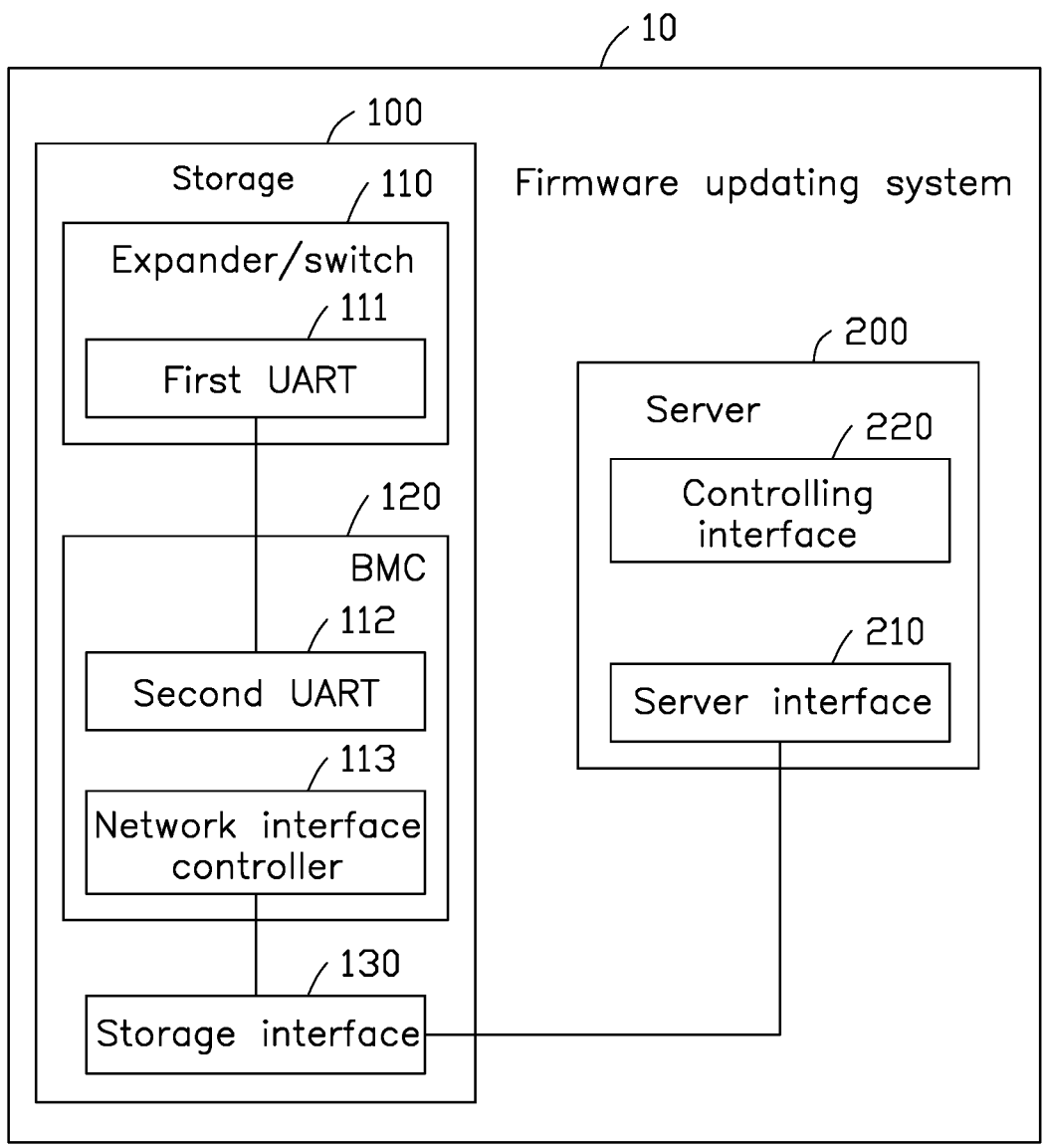
FIG. 1 is a diagram illustrating an embodiment of a firmware updating system according to the present disclosure.

FIG. 1 illustrates a firmware updating system 10. The firmware updating system 10 includes a storage 100 and a server 200. The storage includes a baseboard manager controller (BMC) 120, an expander/switch 110, and a storage interface 130. The expander/switch 110 includes a first UART 111. The BMC 120 includes a second UART 112 and the network interface controller 113. The server 200 includes a server interface 210 and a controlling interface 220.

The BMC 120 is configured to execute a platform management of hardware devices in the storage 100. For example, the BMC 120 can record information as to the hardware devices and logs while managing the platform, such as firmware updating data of the expander/switch 110.

The BMC 120 establishes a serial communication between the second UART 112 and the first UART 111 in the expander/switch 110 based on preset serial parameters. Before establishing the serial communication, serials need to be initialized for synchronizing parameters and parity information of the second UART 112 and the first UART 111, thus the communication between the second UART 112 and the first UART 111 is ensured. For example, after initializing the serials of the BMC 120, the expander/switch 110 confirms a communication protocol between the expander/switch 110 and the BMC 120 by sending handshake information. In detail, when initializing the serials of the second UART 112 and the first UART 111, the parameters, such as band rate, parity check bit, stop bit, and data bit, are set. For example, the band rate is set at 115200, the data bit is set at 8 bit, the stop bit is set at 1 bit, and there is no parity check bit.

For example, when the BMC 120 receives the handshake information of "NAK", a checksum checking manner is used for checking the expander/switch 110. When the BMC 120 receives the handshake information of "C", a cyclic redundancy check (CRC) checking manner is used for checking the expander/switch 110.

The BMC 120 segments and encapsulates firmware updating data based on a Xmodem protocol or a Xmodem-1K protocol to form several fragmented packets, which are sent to the expander/switch 110. The expander/switch 110 stores the received fragmented packets until all the fragmented packets are received. After receiving all the fragmented packets, the expander/switch 110 resolves the fragmented packets to obtain the firmware updating data, and executes an updating operation based on the resolved firmware updating data.

The amount of data of the firmware updating is large, thus the firmware updating data needs to be segmented. For example, when using the Xmodem communication protocol, a size of each fragmented packet is 132 bit. A size of the data content in each fragmented packet is 128 bit, a protocol header is SOH. For example, when using the Xmodem-1K communication protocol, a size of each fragmented packet is 1024 bit, and a protocol header is STX.

When using a standard format (such as Xmodem or Xmodem-1K communication protocol) for transmitting data, the data in the fragmented packets needs to be verified. For example, the checksum checking manner or the CRC checking manner is used for verifying a correctness of the data in the fragmented packets.

The expander/switch 110 can be a serial attached small computer system interface (SAS) expander, or a peripheral component interconnect express (PCIE) switch. The expander/switch 110 is configured to centrally manage the hard disks or the flash memories.

The expander/switch 110 pre-stores firmware instructions for programing. The firmware instructions are serial updating instructions in an inherent command line (CLI) interface of the expander/switch 110. In present disclosure, by using the firmware instructions, a development cost is reduced, and an efficiency is improved. For example, the firmware instruction of CLI is set as "fdl 0/1/2 0 y", where "fdl" represents firmware update with three parameters. For example, "0/1/2" serves as a first parameter representing different file storing positions corresponding to different firmware files while being programed. "0" serves as a second parameter representing an offset address of the storing position, and the second parameter is usually set as 0. The "y" serves as a third parameter indicating whether or not the flash needs to be erased. The third parameter can be "y" or "n".

When receiving a programing instruction from the BMC 120, the expander/switch 110 resolves the firmware instruction (such as CLI instruction) to obtain specified instruction and the corresponding parameters. The expander/switch 110 selects a storage position corresponding to the firmware file based on the parameters in the burning instruction, such as a value of the first parameter.

The storage interface 130 and the server interface 210 can be RJ45 interfaces. In detail, the RJ45 interface is a standard module interface for transmitting data between the storage 100 and the server 200.

The network interface controller 113 can be a dedicated network interface controller (NIC) for achieving a communication with the storage interface 130.

The network interface controller 113 can connect with the expander/switch 110, the BMC 120, and the server 200 in a common local area network (LAN) for transmitting data.

The server 200 can control just a bunch of disks (JBODs) or nvme just a bunch of nvme flashes (JBOFes) in the storage 100 by a BMC controlling interface or an intelligent platform management interface (IMPI) in the controlling interface 220.

The controlling interface 220 can connect with the server 200 through the LAN. The controlling interface 220 can receive control instructions from users for controlling the server 200 to send firmware data packets to the storage interface 130.

Figure 2:
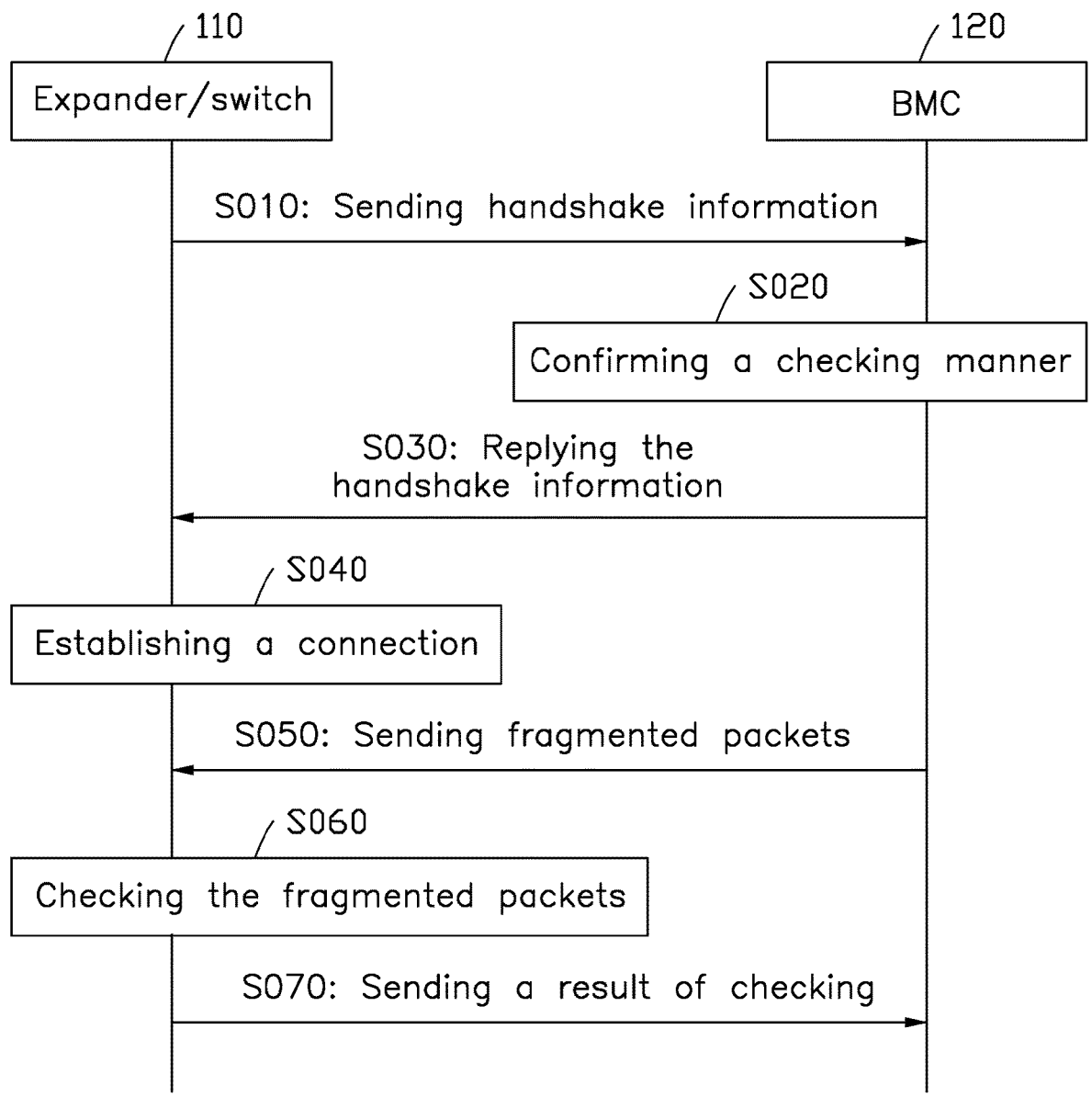
FIG. 2 is flowchart illustrating a first embodiment of a method for updating firmware according to the present disclosure.

FIG. 2 illustrates a first method for improving a firmware update. As shown in FIG. 2, using the Xmodem protocol as an example for updating firmware, the method for improving a firmware update is used in the firmware updating system 10. FIG. 1 of the present disclosure shows process for updating a firmware of an expander/switch 110. The method includes the following steps, these steps may be re-ordered:

In block S010, the expander/switch 100 sends handshake information.

In the block S10, when the firmware in the expander/switch 110 needs to be updated, the expander/switch 110 needs to establish a connection with the BMC 120. Thus, the expander/switch 110 sends the handshake information. Under Xmodem protocol, a size of each fragmented packed is 132 bit. A size of the data content in each fragmented packet is 128 bit. A packet header, a packet sequence number, a packet sequence number's complement, and a check code occupy 4 bit.

In block S020, the BMC 120 confirms a checking manner.

In the block S020, the BMC 120 receives the handshake information, and determines the checking manner used in the expander/switch 110 based on the handshake information. For example, the checking manner may be a checksum checking manner or a CRC checking manner.

In block S030, the BMC 120 replies the handshake information.

In block S040, the expander/switch 110 establishes a connection with the BMC 120.

In the blocks S030 and S040, after receiving the handshake information, the BMC 120 replies to the expander/switch 110 for confirming a protocol being used, such as Xmodem protocol or Xmodem-1K protocol, while exchanging information between the expander/switch 110 and the BMC 120.

In block S050, the BMC 120 sends fragmented packets.

In the block S050, the BMC 120 segments the firmware update data from the server 200 into the fragmented packets, each of which contains the data in 128 bit. The BMC 120 also adds a packet header, a packet sequence number, a packet sequence number's complement, and a check code to each fragmented packet for achieving each fragmented packet. The overall size of each fragmented packet is 132 bit. The BMC 120 sends the packed fragmented packet to the expander/switch 110.

In block S060, the expander/switch 110 checks the fragmented packets.

In block S070, the expander/switch 110 sends a result of checking.

In the blocks S060 and S070, after receiving the fragmented packets, the expander/switch 110 determines correctness of the data based on the packet sequence number and the check code of the received fragmented packet of the firmware data. When the data is confirmed to be correct, a confirming character "ACK" is sent to the BMC 120, confirming that a next fragmented packet can be received. When the data is found to be incorrect, a character "NAK" is sent to the BMC 120, for resending that fragmented packet.

When using a manner for checksum checking, the expander/switch 110 sums the data information in the fragmented packets and compares a last number of the total data information with the check code. When the last number is same as the check code, this confirms that there is no mistake in the fragmented packet while transmitting, and the checking result is pass. When the last number is different from the check code, this indicates an error in the fragmented packed while transmitting, the checking result is failed. If the expander/switch 110 replies the character "NAK", the BMC 120 resends the fragmented packet.

When using CRC as the manner of checking, the BMC 120 computes a value of the information contained in the fragmented packet using a CRC checking formula and attaches the computed value after the check code in the fragmented packet. The expander/switch 110 also executes same operations as the BMC 120. Since the same CRC checking formula and the same inputted information are contained in the fragmented packet, in a non-error transmission, the value obtained by the expander/switch 110 is the same as the value obtained by the BMC 120. When the value obtained by the expander/switch 110 is different from the value obtained by the BMC 120, an error exists in the sending of data, and the receiver can require the data sender to resend the data. For example, the CRC checking formula can be CRC-8, CRC-12, CRC-16, CRC-CCITT, CRC-32, or CRC-32C, or the like.

After the last fragmented packet is sent to the expander/switch 110, the BMC 120 sends "EOT", an end character representing that all firmware updating data has been sent.

In another embodiment, while transmitting the fragmented packets, the expander/switch 110 sends a stop instruction or a stop character, such as "CAN" character, the transmission process will end without conditions. When receiving the stop instruction or the stop character, the BMC 120 will cease sending the fragmented packets without sending the end character "EOT".

While packaging the fragmented packets, where data remaining is less than 128 bit, then 0x1A (Ctrl-Z) is used as data for padding. According to the Xmodem protocol or the Xmodem-1K protocol, if a single fragmented packet is sent by the BMC 120 more than ten times, the sending operation is canceled and the communication with the first UART 111 is ended.

After all the fragmented packets are transmitted, the BMC 120 sends a CLI instruction "reset" to the expander/switch 110 for resetting the expander/switch 110, and the updated firmware in the expander/switch 110 becomes effective.

After the firmware in the expander/switch 110 is updated, the BMC 120 sends a serial instruction to end a communication with the first UART 111 in the expander/switch 110, ends the communication, and informs the controlling interface 220 in the server 220.

Figure 3:
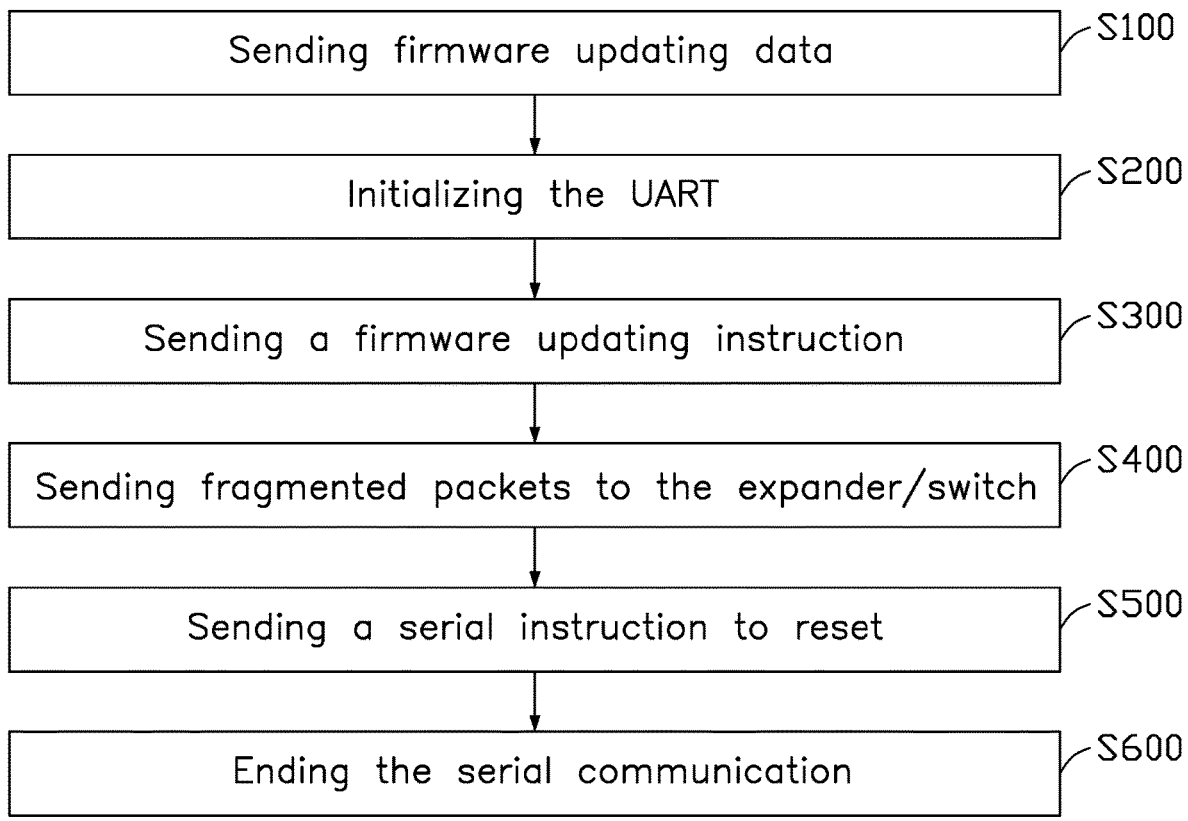
FIG. 3 is a flowchart illustrating a second embodiment of a method for updating firmware according to the present disclosure.

FIG. 3 illustrates a second embodiment of the method for improving firmware update used in a firmware updating system 10 in FIG. 1. The firmware updating system 10 includes a storage 100 and a server 200. The storage includes a baseboard manager controller (BMC) 120, an expander/switch 110, and a storage interface 130. The expander/switch 110 includes a first UART 111. The BMC 120 includes a second UART 112 and the network interface controller 113. The server 200 includes a server interface 210 and a controlling interface 220. The method includes the following steps, these steps may be re-ordered:

In block S100, firmware updating data is sent.

In the block S100, the server 200 sends the firmware file to the BMC 120. The server 200 can communicate with the BMC 120 by RJ45 interface for transmitting data.

In block S200, the UART 111 is initialized.

In the block S200, the server 200 sends an initializing instruction to the first UART 111 in the expander/switch 110. The manner of initialization is the same as that described above, referring to FIGS. 1 and 2.

In block S300, a firmware updating instruction is sent.

In the block S300, the BMC 120 sends the firmware updating instruction to the expander/switch 110. The manner of sending is the same as that above, referring to FIG. 1.

In block S400, the fragmented packets are sent to the expander/switch 110.

In the block S400, the sending manner is the same as in the above description, referring to FIG. 1.

In block S500, a serial instruction to reset is sent.

In the block S500, the BMC 120 sends the reset serial instruction to the expander/switch 110, the sending manner is the same as in the above description, referring to FIG. 1.

In block S600, the serial communication is ended.

In the block S600, the BMC 120 sends a serial instruction to end a communication with the first UART 111, the sending manner is the same as in the above description, referring to FIG. 1.

The firmware updating method and firmware updating system 10 of the present disclosure can transmit firmware updating data by the first UART 111 in the expander/switch 110, the hardware does not need to be changed. Using burning instructions and the transmission protocol in the expander/switch 110, the firmware is updated without interference being caused to the data transmission of the expander/switch 110.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over current art, or to enable others of ordinary skill in the art to understand the embodiments disclosed herein.

What is claimed is:

1. A firmware updating system for improve firmware update in an expander/switch, the system comprises:
    a storage configured to receive firmware data packets and storing data, the storage comprises an expander/switch, a baseboard manager controller (BMC), and a storage interface; the expander/switch is configured to manage hard disks or flash memories, wherein
    the BMC establishes a communication connection between the expander/switch and the storage interface,
    the storage interface is configured to receive the firmware data packets and transmit to the BMC,
    the BMC is configured to convert the firmware data packets into a standard format and send the firmware data packets in the standard format to the expander/switch; the standard format meets one of a Xmodem protocol or a Xmodem-1K protocol, the BMC further segments and encapsulates the firmware updating data to form several fragmented packets before sending the firmware updating data,
    the expander/switch is configured to update firmware in the expander/switch based on the firmware data packets in the standard format,
    the BMC comprises a first universal asynchronous receiver/transmitter (UART),
    the expander/switch comprises a second UART, and
    the first UART in the BMC communicates with the second UART in the expander/switch for transmitting the fragmented packets, which is used to update the firmware.

2. The firmware updating system of claim 1, wherein the firmware updating system further comprises a server, the server comprises a server interface, the server interface establishes a communication connection with the storage interface, and the server is configured to send the firmware data packets to the storage interface.

3. The firmware updating system of claim 2, wherein the server interface is RJ45 interface.

4. The firmware updating system of claim 2, wherein:
the server further comprises a controlling interface, the controlling interface is configure to receive control instructions for controlling the server to send the firmware data packets to the storage interface; and
the server also is configured to receive a firmware updating result of the storage.

5. The firmware updating system of claim 1, wherein the BMC is configured to check the firmware data packets.

6. The firmware updating system of claim 5, wherein a checking manner of the BMC comprises a checksum checking manner and a CRC checking manner.

7. The firmware updating system of claim 1, wherein the BMC comprises a network interface controller, the network interface controller communicates with the storage interface.

8. A method of updating firmware, used in a firmware updating system, the firmware updating system comprises a storage, the storage comprises an expander/switch, a baseboard manager controller (BMC), and a storage interface, the expander/switch is configured to manage hard disks or flash memories; the method comprises:
obtaining firmware data packets;
initializing a universal asynchronous receiver/transmitter (UART) in the expander/switch;
sending a firmware updating instruction to the expander/switch by the BMC;
the BMC converting the firmware data packets into a standard format and sending the firmware data packets in the standard format to the expander/switch, segmenting and encapsulating the firmware updating data to form several fragmented packets, sending the several fragmented packets to the expander/switch, the standard format meeting one of a Xmodem protocol or a Xmodem-1K protocol;
updating the firmware stored in the expander/switch with the several fragmented packets;
sending a serial instruction to reset the expander/switch by the BMC; and
ending serial communication by the BMC;
wherein:
establishing a communication between a first UART in the BMC and a second UART in the expander/switch to transmit the fragmented packets.

9. The method of claim 8, wherein the firmware updating system further comprises a server, the server comprises a server interface, the server interface establishes a communication connection with the storage interface, and the server is configured to send the firmware data packets to the storage interface.

10. The method of claim 9, wherein the server interface is RJ45 interface.

11. The method of claim 9, wherein:
the server further comprises a controlling interface, the controlling interface is configured to receive control instructions for controlling the server to send the firmware data packets to the storage interface; and
the server also is configured to receive a firmware updating result of the storage.

12. The method of claim 8, wherein the BMC is configured to check the firmware data packets.

13. The method of claim 12, wherein a checking manner of the BMC can be a checksum checking manner or a CRC checking manner.

14. The method of claim 8, wherein the BMC comprises a network interface controller, the network interface controller communicates with the storage interface.

\* \* \* \* \*